(12) United States Patent
Strbuncelj

(10) Patent No.: US 9,067,763 B2
(45) Date of Patent: Jun. 30, 2015

(54) BEARING CARTRIDGE AND ELEVATOR MACHINE ASSEMBLY

(75) Inventor: Zlatko Strbuncelj, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 367 days.

(21) Appl. No.: 13/497,873

(22) PCT Filed: Nov. 13, 2009

(86) PCT No.: PCT/US2009/064336
§ 371 (c)(1),
(2), (4) Date: Mar. 23, 2012

(87) PCT Pub. No.: WO2011/059442
PCT Pub. Date: May 19, 2011

(65) Prior Publication Data
US 2012/0267199 A1    Oct. 25, 2012

(51) Int. Cl.
B66B 11/04 (2006.01)
F16C 33/10 (2006.01)
F16C 33/66 (2006.01)
F16C 35/04 (2006.01)

(52) U.S. Cl.
CPC ............. B66B 11/043 (2013.01); F16C 33/664 (2013.01); F16C 35/04 (2013.01)

(58) Field of Classification Search
CPC .. B66B 11/08; B66B 11/043; B66B 11/0438; F16C 350/04; F16C 33/664
USPC ................... 187/254; 254/266, 362; 384/462, 384/473–475
See application file for complete search history.

(56) References Cited

U.S. PATENT DOCUMENTS

| | | |
|---|---|---|
| 4,030,785 A | 6/1977 | Robinson et al. |
| 4,327,924 A | 5/1982 | Wheeler |
| 4,948,271 A | 8/1990 | Nunotani et al. |

(Continued)

FOREIGN PATENT DOCUMENTS

| | | |
|---|---|---|
| CN | 201031103 Y | 3/2008 |
| EP | 1486450 A1 | 12/2004 |

(Continued)

OTHER PUBLICATIONS

International Preliminary Report on Patentability for International application No. PCT/US2009/064336 dated May 24, 2012.

(Continued)

*Primary Examiner* — Michael Mansen
*Assistant Examiner* — Diem Tran
(74) *Attorney, Agent, or Firm* — Carlson, Gaskey & Olds

(57) ABSTRACT

An exemplary bearing cartridge assembly includes an inner sleeve. An outer housing is supported for rotation relative to the inner sleeve. A bearing member within the outer housing and received about the inner sleeve facilitates rotation of the outer housing relative to the inner sleeve. The bearing member has an axial dimension (e.g., a width) that is smaller than an axial inner dimension of the outer housing. The bearing member is positioned relative to the inner sleeve and the outer housing to provide a first lubricant space between one side wall of the outer housing and the bearing member and a second lubricant space between an opposite side wall of the outer housing and the bearing member. There is at least one through passage between the first and second lubricant spaces to allow lubricant to move between them.

20 Claims, 2 Drawing Sheets

(56) References Cited

U.S. PATENT DOCUMENTS

| | | |
|---|---|---|
| 5,018,603 A | 5/1991 | Ito |
| 5,145,334 A | 9/1992 | Gutknecht |
| 5,435,417 A | 7/1995 | Hakala |
| 5,806,653 A | 9/1998 | Ahls et al. |
| 5,982,060 A * | 11/1999 | Hakala et al. ............... 310/67 R |
| 6,234,275 B1 | 5/2001 | Hakala et al. |
| 6,345,695 B1 | 2/2002 | Fargo et al. |
| 6,547,438 B2 | 4/2003 | Shima |
| 6,630,758 B2 | 10/2003 | Aoki et al. |
| 6,739,757 B2 | 5/2004 | Kai et al. |
| 6,796,548 B2 | 9/2004 | Nagata et al. |
| 6,935,786 B2 | 8/2005 | Hirano et al. |
| 7,387,445 B2 | 6/2008 | Swainson |
| 7,401,980 B2 | 7/2008 | Krauss et al. |
| 8,360,650 B2 * | 1/2013 | Morales Espejel et al. .. 384/473 |
| 2001/0011617 A1 * | 8/2001 | Hakala et al. ................. 187/256 |
| 2008/0019629 A1 | 1/2008 | McKeirnan |
| 2012/0314984 A1 * | 12/2012 | Honda .......................... 384/462 |
| 2014/0341490 A1 * | 11/2014 | Ito et al. ........................ 384/471 |

FOREIGN PATENT DOCUMENTS

| | | | | |
|---|---|---|---|---|
| GB | 2248278 A | * | 4/1992 | ............. F16C 27/00 |
| JP | 06235425 A | * | 8/1994 | ............. F16C 33/66 |
| JP | 8091745 A | | 4/1996 | |
| JP | 2001278571 A | | 10/2001 | |
| JP | 2007240002 A | | 9/2007 | |
| JP | 2008222372 A | | 9/2008 | |
| JP | 2008259263 A | | 10/2008 | |

OTHER PUBLICATIONS

International Search Report and Written Opinion of the International Searching Authority for International application No. PCT/US2009/064336 mailed Jul. 28, 2010.

* cited by examiner

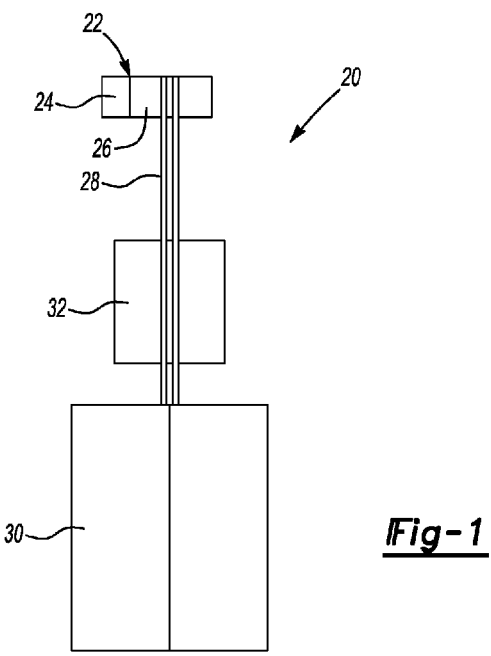
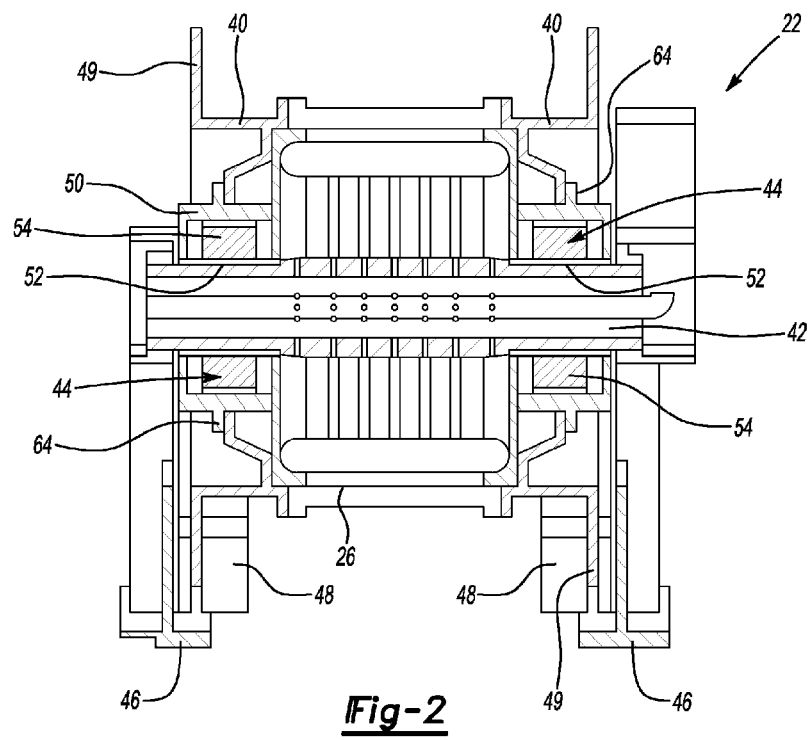

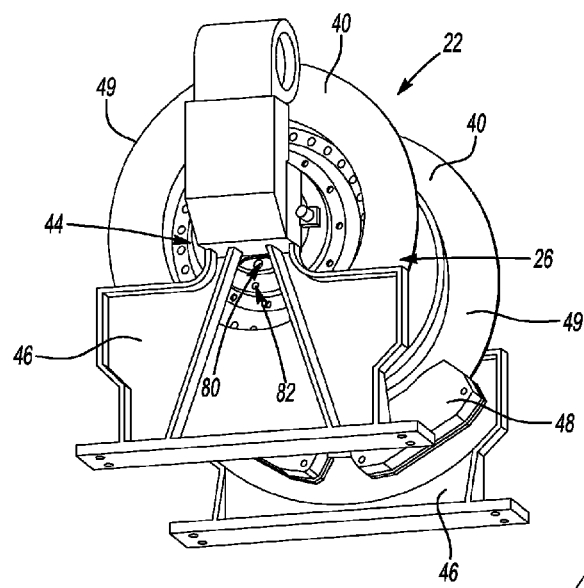
Fig-3
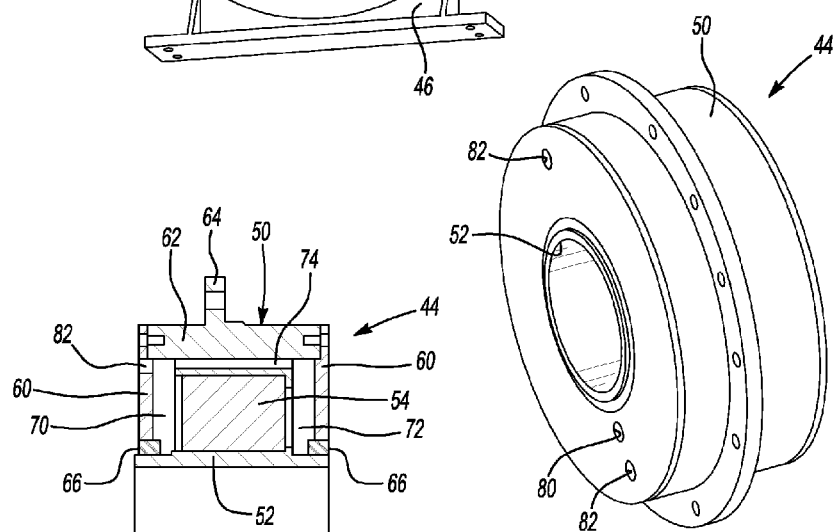
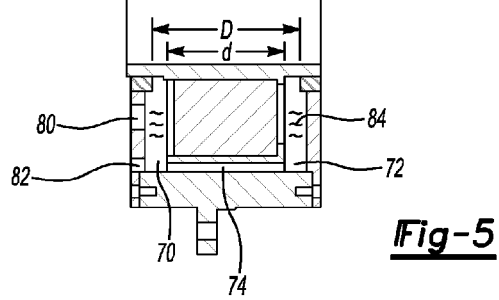
Fig-4
Fig-5

BEARING CARTRIDGE AND ELEVATOR MACHINE ASSEMBLY

BACKGROUND

Elevators carry passengers, cargo or both between various levels in a building. There are a variety of arrangements for controlling the movement and position of an elevator car. Some elevator systems are traction-based. Such arrangements typically include a machine that selectively causes rotation of a traction sheave. A load bearing arrangement that includes ropes or belts moves responsive to movement of the traction sheave. The load bearing arrangement suspends a car and counterweight within a hoistway. A machine control is utilized to control the position and movement of the elevator car.

There are challenges presented in maintaining such elevator systems. For example, the components for the elevator machine and traction sheave need to be robust enough to support the loads associated with the elevator system. Additionally, such components must provide an adequate service life so that repair or replacement is not necessary for relatively long periods of time.

SUMMARY

An exemplary bearing cartridge assembly includes an inner sleeve. An outer housing is supported for rotation relative to the inner sleeve. A bearing member within the outer housing and received about the inner sleeve facilitates rotation of the outer housing relative to the inner sleeve. The bearing member has an axial dimension (e.g., a width) that is smaller than an axial inner dimension of the outer housing. The bearing member is positioned relative to the inner sleeve and the outer housing to provide a first lubricant space between one side wall of the outer housing and the bearing member and a second lubricant space between an opposite side wall of the outer housing and the bearing member. There is at least one through passage between the first and second lubricant spaces to allow lubricant to move between them.

An exemplary elevator machine assembly includes a stationary shaft. A plurality of sleeves are spaced apart and supported on the shaft to remain stationary relative to the shaft. A corresponding plurality of outer housings are each supported for rotation relative to one of the sleeves. A bearing member within each outer housing is received about the corresponding one of the sleeves. The bearing members facilitate rotation of the outer housings relative to the corresponding inner sleeves. The bearing members have an axial dimension (e.g., a width) that is smaller than an axial inner dimension of the outer housing. The bearing member is positioned relative to the sleeve and the outer housing to provide a first lubricant space between one side wall of the outer housing and the bearing member. A second lubricant space is positioned between an opposite side wall of the outer housing and the bearing member. There is at least one through passage between the first and second lubricant spaces to allow lubricant to move between them. A plurality of end bell members are each secured to one of the outer housings. A traction sheave is supported by the end bell members for rotation relative to the stationary shaft.

The various features and advantages of a disclosed example embodiment will become apparent to those skilled in the art from the following detailed description. The drawings that accompany the detailed description can be briefly described as follows.

BRIEF DESCRIPTION OF THE DRAWINGS

FIG. 1 schematically illustrates selected portions of an elevator system.

FIG. 2 is a cross-sectional illustration of selected portions of an example elevator machine assembly.

FIG. 3 is a perspective illustration of an example elevator machine assembly.

FIG. 4 is a perspective illustration of an example bearing cartridge assembly.

FIG. 5 is a cross-sectional illustration of the example bearing cartridge assembly of FIG. 4.

DETAILED DESCRIPTION

FIG. 1 schematically shows selected portions of an elevator system 20. An elevator machine assembly 22 includes a motor 24 and a traction sheave 26. A plurality of load bearing members 28 (e.g., a roping arrangement comprising ropes or flat belts) suspends an elevator car 30 and counterweight 32. The load bearing members 28 move responsive to movement of the traction sheave 26 to cause desired movement of the elevator car 30 to provide requested elevator service, for example.

FIGS. 2 and 3 illustrate selected portions of an example machine assembly 22. In this example the traction sheave 26 is supported by end bell members 40, which are positioned on opposite ends of the traction sheave 26. The end bell members 40 and the traction sheave 26 are rotatable relative to a stationary shaft 42. Bearing cartridge assemblies 44 facilitate the relative rotation necessary for movement of the traction sheave 26 as desired. In this example, the stationary shaft 42 remains stationary relative to a machine frame or mounting arrangement 46. This example includes brake members 48 that apply a braking force to a flange 49 on at least one of the end bell members 40 to slow down or stop rotation of the traction sheave 26 to control the position of the elevator car 30.

As can be appreciated from FIGS. 2-5, an example bearing cartridge assembly 44 includes an outer housing 50 that rotates with a corresponding end bell member 40. An inner sleeve 52 is fixed relative to the stationary shaft 42. A bearing member 54 is positioned between the outer housing 50 and the inner sleeve 52 to facilitate the relative rotation between those components and the rotation of the traction sheave 26 about the stationary shaft 42. In one example, the bearing member 54 comprises an inner race and an outer race as known in the art.

As can best be appreciated from FIG. 5, the outer housing 50 includes side walls 60 on the axial ends of the outer housing 50. An end wall 62 is secured to each of the side walls 60 and extends between them. The end wall 62 in this example includes a flange 64 that is configured to be secured to a corresponding portion of the end bell members 40 so that the end bell members 40 and the outer housing 50 rotate together about the stationary shaft 42.

This example includes seal members 66 at the interface between the outer housing 50 and the inner sleeve 52. In one example, the seal members 66 comprise annular labyrinth seals at the interfaces between the side walls 60 and the inner sleeve 52. These are contactless seals that maintain a closed interior inside the space between the outer housing 50 and the inner sleeve 52.

The bearing member 54 has an axial dimension d (e.g., a width or thickness) that is less than an inside axial dimension D of the outer housing 50. This smaller axial dimension d of the bearing member 54 and the position of it within the outer housing 50 provides a first lubricant space 70 between the bearing member 54 and one of the side walls 60 and a second lubricant space 72 between the bearing member 54 and the other side wall 60. At least one through passage 74 extends between the lubricant spaces 70 and 72.

In the illustrated example, the through passage 74 is near a radially outward edge of the bearing member 54. In one example, the through passage is at least partially formed in a surface of the bearing member 54. In one example, the through passage is at least partially formed within the end wall 62 of the outer housing 50.

One feature of the illustrated example is that it allows for using oil as a lubricant within the bearing cartridge assembly 44. One advantage of using oil compared to grease as the lubricant is that it allows for more efficiently and reliably maintaining a desired lubrication level for the elevator machine assembly 22. The illustrated example includes a sight portion 80 (e.g., a clear or translucent material) in at least one of the side walls 60 through which the interior of at least one of the lubricant spaces 70, 72 can be observed from outside of the machine assembly 22. This allows for visual inspection of a current lubricant level or condition within the bearing cartridge assembly 44. As can be appreciated from FIG. 3, positioning the sight portion 80 toward the exterior of the machine assembly 22 allows for manual inspection to determine a condition or level of lubricant without having to remove any of the components of the machine assembly 22 from their assembled position.

The illustrated example includes at least one selectively opened lubricant port 82 for introducing lubricant into the lubricant spaces 70 and 72 or for removing lubricant from those spaces. As can be appreciated from FIGS. 4 and 5, one lubricant port 82 is positioned diametrically opposite another lubricant port 82. When the sheave 26 is rotated into a position where one of the lubricant ports 82 is near a top of the assembly, that lubricant port provides a convenient location for introducing lubricant such as oil 84 into the lubricant spaces 70 and 72. The lower positioned lubricant port 82 provides a convenient drain for draining out the lubricant. The through passages 74 allow for communication of the lubricant, such as oil 84, between the lubricant spaces during a filling or draining procedure. Such an arrangement provides efficiency and reliability for servicing or maintaining an elevator machine assembly including such a bearing cartridge assembly 44. With oil 84 as the lubricant, the lubricant spaces can be completely drained in an efficient and reliable manner to provide clean lubricant as may be needed. Strategically positioning the lubricant ports 82 allows a technician to readily accomplish such a procedure without having to disassemble any portion of the machine assembly 22.

With previous elevator machine arrangements, servicing bearings typically requires disassembling at least a portion of the machine assembly in order to service the bearings. The disclosed example bearing cartridge assembly 44 reduces the amount of labor, complexity and cost associated with maintaining bearings for an elevator machine assembly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A bearing cartridge assembly, comprising:
   an inner sleeve;
   an outer housing supported for rotation relative to the inner sleeve, the outer housing having side walls at opposite axial ends of the outer housing, the outer housing having an end wall extending in an axial direction between the side walls, wherein the end wall and the side walls are situated with respect to the inner sleeve so that there is a closed interior space defined between the sidewalls of the outer housing and between the end wall of the outer housing and an axially extending, radially outer most surface on the inner sleeve, the side walls of the outer housing having radially facing ends that are received adjacent to the axially extending, radially outermost surface of the inner sleeve; and
   a bearing member within the outer housing and received about the inner sleeve for facilitating rotation of the outer housing relative to the inner sleeve, the bearing member having an axial dimension that is smaller than an axial dimension of the end wall in the interior space, the bearing member being positioned relative to the inner sleeve and the outer housing to provide a first lubricant space between one of the side walls of the outer housing and the bearing member.

2. The assembly of claim 1, comprising a second lubricant space between the other of the side walls of the outer housing and the bearing member, there being at least one through passage between the first and second lubricant spaces to allow lubricant to move between the first and second lubricant spaces.

3. The assembly of claim 2, wherein the through passage is at least partially formed in at least one of the end wall of the outer housing or a surface of the bearing member.

4. The assembly of claim 1, wherein the bearing member has a radial dimension corresponding to a distance between the inner sleeve and an inner surface on the end wall of the outer housing and wherein the first lubricant space extends along the entire radial dimension of the bearing member.

5. The assembly of claim 1, wherein at least one of the outer housing side walls includes at least one portion through which the lubricant space can be observed from outside the assembly.

6. The assembly of claim 1, wherein at least one of the outer housing side walls has a selectively opened lubricant port for introducing lubricant into the lubricant space or removing lubricant from the lubricant space.

7. The assembly of claim 6, wherein the lubricant port is near a radially outward end of the lubricant space.

8. The assembly of claim 1, comprising oil in the lubricant space.

9. The assembly of claim 1, wherein the outer housing comprises a flange configured for securing the outer housing to a sheave of the elevator machine through an end bell member so that the outer housing and the bearing member are rotatable with the sheave of the elevator machine.

10. The assembly of claim 1, comprising
    at least one seal at an interface between the inner sleeve and the respective side walls of the outer housing.

11. The assembly of claim 10, wherein the at least one seal comprises an annular labyrinth seal.

12. An elevator machine assembly, comprising
    a stationary shaft;
    a plurality of sleeves spaced apart and supported on the shaft to remain stationary relative to the shaft;
    a corresponding plurality of outer housings each supported for rotation relative to a corresponding one of the sleeves, the outer housings respectively comprising side walls at opposite axial ends of the outer housing and an end wall extending in an axial direction between the side walls, wherein the end wall and the side walls are respectively situated with respect to the corresponding one of the sleeves so that there is a closed interior space defined between the sidewalls of the outer housing and between the end wall of the outer housing and an axially extending, radially outer most surface on the corresponding one of the inner sleeves, the side walls of the outer housing having radially facing ends that are received adjacent to the axially extending, radially outermost surface on the corresponding one of the inner sleeves;

a bearing member within each outer housing and received about the corresponding one of the sleeves for facilitating rotation of the outer housing relative to the sleeve, the bearing member having an axial dimension that is smaller than an inner axial dimension of the end wall in the interior space, the bearing member being positioned relative to the corresponding one of the sleeves and the outer housing to provide a first lubricant space between one of the side walls of the outer housing and the bearing member;

a plurality of end bell members each secured to one of the outer housings; and a traction sheave supported by the end bell members for rotation relative to the stationary shaft.

13. The assembly of claim 12, comprising a second lubricant space between the other one of the side walls of the outer housing and the bearing member, there being at least one through passage between the first and second lubricant spaces to allow lubricant to move between the first and second lubricant spaces.

14. The assembly of claim 13, wherein the through passage is at least partially formed in at least one of the end wall of the outer housing or a surface of the bearing member.

15. The assembly of claim 12, wherein the bearing member has a radial dimension corresponding to a distance between the sleeve and an inner surface on the end wall of the outer housing and wherein the first lubricant space extends along the entire radial dimension of the bearing member.

16. The assembly of claim 12, wherein at least one of the outer housing side walls includes at least one portion through which the lubricant space can be observed from outside the assembly.

17. The assembly of claim 12, wherein at least one of the outer housing side walls includes a selectively opened lubricant port for introducing lubricant into the lubricant space or removing lubricant from the lubricant space.

18. The assembly of claim 17, wherein the lubricant port is near a radially outward end of the lubricant spaces.

19. The assembly of claim 12, comprising oil in the lubricant space.

20. The assembly of claim 12, comprising
at least one labyrinth seal at an interface between the sleeve and the respective side walls of the outer housing.

* * * * *